United States Patent [19]
Nishio

[11] Patent Number: 5,887,192
[45] Date of Patent: Mar. 23, 1999

[54] SOFTWARE USAGE MEASUREMENT APPARATUS FOR IMPOSING A PROPER CHARGE IN ACCORDANCE WITH NUMBER OF TIMES MULTIMEDIA UNIT DATA OF A SOFTWARE IS BEING PROCESSED

[75] Inventor: Nobuhiko Nishio, Kawasaki, Japan

[73] Assignee: Fujitsu Limited, Kawasaki, Japan

[21] Appl. No.: 506,031

[22] Filed: Jul. 24, 1995

[30] Foreign Application Priority Data

Aug. 10, 1994 [JP] Japan ................................. 6-219366

[51] Int. Cl.⁶ .................................................. G06F 13/00
[52] U.S. Cl. ........................ 395/827; 395/840; 395/854
[58] Field of Search ........................... 395/184.01, 827, 395/840, 854; 380/4, 5; 348/13, 231, 390; 364/464.01, 385; 370/517; 386/109

[56] References Cited

U.S. PATENT DOCUMENTS

| | | | |
|---|---|---|---|
| 4,247,106 | 1/1981 | Jeffers et al. | 463/29 |
| 4,439,670 | 3/1984 | Basset et al. | 235/382 |
| 4,446,519 | 5/1984 | Thomas | 395/491 |
| 4,484,217 | 11/1984 | Block et al. | 348/3 |
| 4,558,176 | 12/1985 | Arnold et al. | 380/4 |
| 4,590,557 | 5/1986 | Lillie | 395/651 |
| 4,646,234 | 2/1987 | Tolman et al. | 380/4 |
| 4,649,510 | 3/1987 | Schmidt | 380/4 |
| 4,654,799 | 3/1987 | Ogaki et al. | 364/479.04 |
| 4,658,093 | 4/1987 | Hellman | 380/25 |
| 4,672,554 | 6/1987 | Ogaki | 364/479.04 |
| 4,674,055 | 6/1987 | Ogaki et al. | 364/479.04 |
| 4,740,890 | 4/1988 | William | 395/186 |
| 4,780,905 | 10/1988 | Cruts et al. | 380/44 |
| 4,787,050 | 11/1988 | Suzuki | 364/479.04 |
| 4,816,653 | 3/1989 | Anderl et al. | 235/380 |
| 4,816,654 | 3/1989 | Anderl et al. | 235/380 |
| 4,817,140 | 3/1989 | Chandra et al. | 380/4 |
| 4,864,516 | 9/1989 | Gaither et al. | 395/806 |
| 4,879,645 | 11/1989 | Tamada et al. | 235/380 |
| 4,949,257 | 8/1990 | Orbach | 395/221 |
| 4,999,806 | 3/1991 | Chernow et al. | 395/712 |
| 5,006,849 | 4/1991 | Baarman et al. | 341/95 |
| 5,008,814 | 4/1991 | Mathur | 395/200.1 |
| 5,014,234 | 5/1991 | Edwards, Jr. | 395/186 |
| 5,016,009 | 5/1991 | Whiting et al. | 341/67 |

(List continued on next page.)

FOREIGN PATENT DOCUMENTS 2-240710  9/1990  Japan .
2-294855  12/1990  Japan .

OTHER PUBLICATIONS

Japanese Patent Laid–Open Publication No. 57–127249, Aug. 7, 1982 (equivalent to Japanese Patent Publication No. 61–22815).
Japanese Patent Laid–Open Publication No. 5–89363, Apr. 9, 1993.
Japanese Patent Laid–Open Publication No. 5–266575, Oct. 15, 1993.
Japanese Patent Laid–Open Publication No. 5–298085, Nov. 12, 1993.
Japanese Patent Laid–Open Publication No. 6–95871, Apr. 8, 1994.

*Primary Examiner*—Le Hien Lun
*Attorney, Agent, or Firm*—Staas & Halsey

[57] ABSTRACT

A DES decrypting unit decrypts video data frames encrypted and compressed based on MPEG standards, when receiving them. The decrypted video data frames are expanded one by one in a MPEG expansion circuit. Each time the single frame is expanded, the MPEG expansion circuit outputs a completion-of-frame-expansion signal to a host control CPU. The host control CPU counts the completion-of-frame-expansion signals and reduces an accounting count value in an accounting data memory in accordance with this count value. The host control CPU outputs character pattern image data from a pattern generator and prohibits the decryption by the DES decrypting unit when the accounting count value becomes 0. The character pattern image data is superimposed on a video signal in an adder circuit.

15 Claims, 10 Drawing Sheets

U.S. PATENT DOCUMENTS

| | | | |
|---|---|---|---|
| 5,023,907 | 6/1991 | Johnson et al. | 380/4 |
| 5,051,822 | 9/1991 | Rhoades | 463/25 |
| 5,056,009 | 10/1991 | Mizuta | 395/490 |
| 5,103,392 | 4/1992 | Mori | 380/4 |
| 5,103,476 | 4/1992 | Waite et al. | 380/4 |
| 5,166,886 | 11/1992 | Molnar et al. | 364/479.04 |
| 5,181,107 | 1/1993 | Rhoades | 348/13 |
| 5,199,066 | 3/1993 | Logan | 380/4 |
| 5,214,697 | 5/1993 | Saito | 380/4 |
| 5,222,134 | 6/1993 | Waite et al. | 380/4 |
| 5,245,330 | 9/1993 | Wassink | 340/825.34 |
| 5,267,171 | 11/1993 | Suzuki et al. | 364/479.04 |
| 5,291,554 | 3/1994 | Morales | 380/5 |
| 5,293,388 | 3/1994 | Monroe et al. | 371/37.01 |
| 5,381,408 | 1/1995 | Brent et al. | 370/517 |
| 5,481,463 | 1/1996 | Constant et al. | 364/464.01 |
| 5,489,941 | 2/1996 | Enokida | 348/390 |
| 5,499,340 | 3/1996 | Barritz | 395/184.01 |
| 5,535,008 | 7/1996 | Yamagishi et al. | 386/109 |
| 5,635,979 | 6/1997 | Kostreski et al. | 348/13 |
| 5,635,982 | 6/1997 | Zhang et al. | 348/231 |
| 5,636,346 | 6/1997 | Saxe | 705/1 |

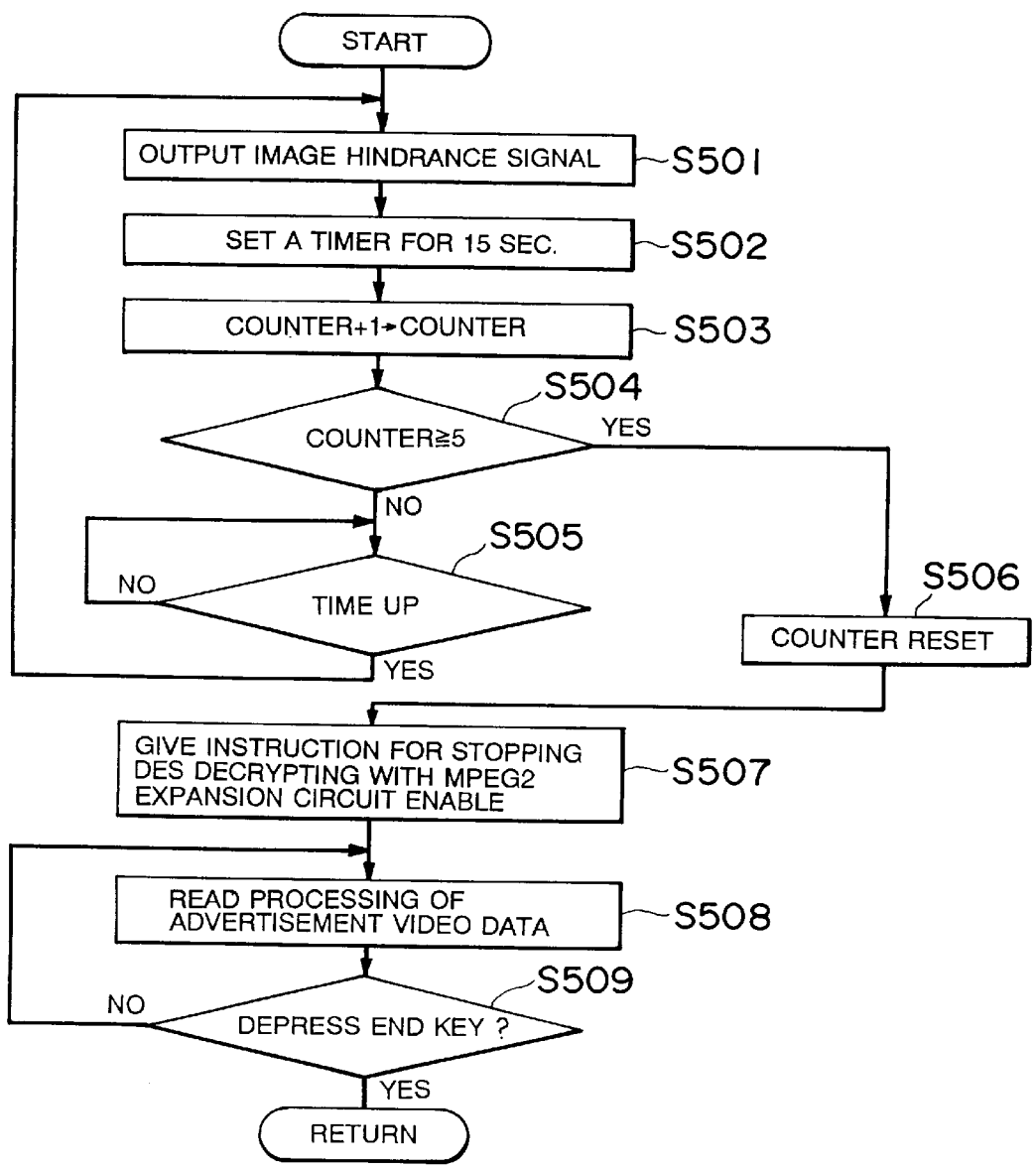

SOFTWARE USAGE MEASUREMENT APPARATUS FOR IMPOSING A PROPER CHARGE IN ACCORDANCE WITH NUMBER OF TIMES MULTIMEDIA UNIT DATA OF A SOFTWARE IS BEING PROCESSED

BACKGROUND OF THE INVENTION

1. Field of the invention

The present invention relates generally to a multimedia information outputting apparatus and a software using quantity measuring apparatus for measuring a using quantity of software such as a computer program, and a picture work, especially digitized software. The present invention relates more particularly to a multimedia information outputting apparatus and a software using quantity measuring apparatus capable of imposing a proper charge even in a case where the software is used in an abnormal mode.

2. Description of the Prior Art

With an advancement of a large scale storage medium such as a CD-ROM, etc. and of a large capacity high-speed communication technology such as a B-ISDN, etc., not only the computer program but also image data and audio data are distributed in the form of digital information via such a media. That is, there are sold CD-ROMs stored with a picture work as hitherto offered in the form of a video tape and a game program. Further, there is also actualized a sales system wherein such a picture work is delivered via a communication line to the user.

By the way, it is quite easy to copy this kind of digital information on other mediums, and, besides, a decline in terms of data quality due to copying as in the case of the analog information is not seen. Accordingly, absolutely the same information can be copied, and there exists a remarkably high possibility in which these acts infringe a profit of the author. Namely, a third party can easily copy the contents of the CD-ROM on other mediums with a mere knowledge about the computer operation simply by possessing a large capacity writable magneto-optic disk device and a magnetic disk device. As described above, in the majority of cases, a rental act of this kind of digital information medium is inhibited by the author for the reason of an impossibility of conducting a sufficient security check. Hence, an end user is not allowed to use the software as far as the end user does not purchase the software. However, this kind of software is expensive at the present. Therefore, the end user has no alternative but to refrain from purchasing the software till the user confirms that the software is identical with the one the user himself or herself really wants to get or usable by the hardware of his or her own. Consequently, collecting the profits from this kind of software tends to make little progress.

For obviating this situation, there starts a realization of a new software distributing system in which a CD-ROM stored with a multiplicity of sets of software restricted in terms of functions is put on the market at a low price, and the end user is informed of a code for canceling the functional restriction in exchange for a remittance of a license fee for a right-of-use of a desired set of software among them. However, setting the right of use involves a difficulty of providing restrictions in a using term and the number of uses. Hence, there is no alternative but to set the right of use for the permanent use. Accordingly, this license fee is inevitably high as in the case of the conventional sales of the software.

In this respect, Japanese Patent Laid-Open Publication No. 6-19707 discloses a system for previously registering an amount of money corresponding to a software usable quantity on an IC card. In this system, a user inserts this IC card into an information apparatus usable (executable, reproducible) this software when using the software requiring a payment of money, the software is made usable or unusable the software in accordance with a balance of the registered amount of money and subtracting the balance each time the software is used once.

In the case of the software of such a type that a series of data are sequentially reproduced in time series as in the case of, especially, moving picture data and audio data, however, the charge can not be properly imposed based on the above method. For example, in the case of moving picture data such as a movie, the software user may temporarily stop the picture in the middle of regenerating the moving picture data and leave the reproducer to perform other operations in some cases. In such a case, the software user again returns in front of the reproducer and resumes the reproduction of the moving picture data from the temporarily stopped data position or the heading position of the moving picture data. In this case, according to the above method, the charge for one usage is imposed on the assumption that the reproduction throughout the whole moving picture data is conceived as one usage, or alternatively, the charge for two usages is imposed on the assumption that the reproduction after returning to the heading position is conceived as another reproduction.

In these choices, if the charge for one usage is imposed even when resuming the reproduction on getting back to the heading position, it is irrational that no charge is imposed on the data of the area where the reproduction has already been effected before the temporary stop. Further, if the charge for two usages is evenly imposed in the case of resuming the reproduction on getting back to the heading position, it is also irrational that there is imposed a charge for the data of a unreproduced area before the temporary stop on the assumption. Further, if the charge for the two usages is uniformly imposed in the case of resuming the reproduction at the temporary stopping position, it follows that a charge which is twice the normal charge is imposed. This is further irrational.

It can be also considered that a charge is imposed corresponding to a data using time in order to avoid such irrationalities. In the state where the temporary stop is effected, however, new items of data are not outputted, and there is nothing but to display image segment which could have a meaning in the form of the moving picture. Accordingly, it is still irrational that the same charge as for performing the normal reproduction is imposed during the temporary stop. This is a first problem inherent in the prior art.

Further, when the digital video data is used, a step search can be done instead of queuing and reviewing in an analog video data. Based on the conventional accounting method, however, there was taken no proper measure about how a charge for such a step search is imposed. In this case, it is impossible to follow up the story of the moving picture during the step search, and, hence, it is strict to impose the charge on the user in the same way as the normal reproduction. This a second problem inherent in the prior art.

SUMMARY OF THE INVENTION

It is a primary object of the present invention to provide a software using quantity measuring apparatus capable of imposing a proper charge even when software is employed in an abnormal mode.

A software using quantity measuring apparatus according to the present invention outputs software containing a plurality of unit data identifiable from each other and thus obtains using quantity data about a usage of the software. The software using quantity measuring apparatus comprises a detecting means for detecting the usage of the unit data, a counting means for counting a total number of usages of the unit data that are detected by the detecting means and a determining means for determining the using quantity of the software in accordance with a counting result of the counting means.

The software according to the present invention includes, in addition to a computer program, image data such as moving picture data of a movie, etc. and audio data of music, etc. This software is constructed of a plurality of unit data. For instance, in the case of the moving picture data, data frame for displaying each static picture which form the moving picture is the unit data. Further, in addition to this, if the data is decomposed per frame, this decomposed frame serves as the unit data. The unit data may be each previously encrypted or compressed. If the unit data is compressed beforehand, there may be provided an expanding means for restoring the unit data by expanding the compressed unit data. If the unit data is encrypted beforehand, there may be a decrypting means for decrypting the encrypted software.

The detecting means detects a usage of the unit data. For example, in the case of the moving picture data, the usage of the unit data corresponds to displaying the individual static pictures and outputting these pictures to an outside display device. Detecting such a usage may involve detecting, e.g., that the unit data is outputted to a monitor device or that the expansion of the compressed unit data by the expanding unit is completed.

The counting means counts a total number of usages of the unit data. Accordingly, if only the same unit data is repeatedly used many times, the counting means counts the total number of repetitive usages. Also, even if the usage is resumed after temporarily stopping the usage of the unit data in the middle of consecutively using the software, counting is not performed during the temporary stop, but the usages of the unit data after the resumption has been made are counted. This counting means is not confined to a one-stage construction but may be constructed at a plurality of stages. The counting means may be constructed to count up every time the detecting means detects the usage of each unit data as well as being constructed to count down.

The determining means determines a using quantity of the software. In this case, the using quantity may be determined elaborately for each of the count values or may be determined for every some count values. Thus, an amount of charge for using the software will be determined corresponding to the determined using quantity. This amount of charge is an amount of payment demanded of the user after the usage of the software or an amount of money for the already-used quantity that is to be subtracted from a prepaid charge for use. In the latter case, the determining means may be constructed to count the second count value corresponding to the prepaid charge for using the software. That is, the determining means may be constructed to change the second count value, corresponding to variations in the first count value by the counting means. An arrangement may be such that the second count value is counted up or down as the total number of usages of the unit data increases. In the case of providing the decrypting means, the decrypting means may be constructed to perform the decrypt processing only until the second count value reaches an unusable value.

There may be further provided a usage hindering means for hindering the usage of the software when the second count value comes to a value indicating the unusability. If constructed in this way, it is possible to prevent an unapproved usage after the second count value reaches the value indicating the unusability. This usage hindering means may be constructed to superimpose a video signal for hindering a normal display of the moving picture on the data displaying the moving picture data.

There may be further provided a switching means for selectively switching a first mode reproducing the moving picture as it is by consecutively outputting the plurality of unit image data and a second mode reproducing the moving picture at a high speed by skip-outputting the plurality of unit image data. If the second mode described above is made executable, this facilitates searching the scene on the screen. In this case, the determining means may set a variation rate of the second count value corresponding to the change in the first count value during the second mode smaller than a variation rate of the second count value corresponding to the change in the first count value during the first mode. If set in this manner, it is feasible to impose a proper small amount of charge for the usage that is not in a normal using mode for following up the story.

Further, a multimedia information outputting apparatus according to the present invention is invented by directing the attention to the fact that each frame for displaying the moving picture is identifiable in multimedia information containing the moving picture and the fact that the using quantity can be measured without depending on a type of the operation on the basis of the number of frames outputted even when reproduction of it is interrupted or some portions of it are repeatedly reproduced. The multimedia information outputting apparatus according to the present invention comprises an integration processing means for integration-processing data about a using quantity corresponding to the number of outputs of the image data serving as a unit of the output and a hindering means for hindering the outputs of at least one part of the multimedia information when the integration-processed using quantity data reaches a predetermined value. The number of outputs indicates the number of outputs of the frames. The integration processing means, when, e.g., reproducing the frames in a skipping manner as in the case of still feeding, integration-processes the using quantity data in accordance with the output number of the skip-outputted frames. The integration processing means may subtract a value corresponding to the output number of frames from a given value.

The audio data can not be generally segmented into a unit sentence having a fixed length. On the other hand, an image of the moving picture is identifiable per frame. Hence, when outputting data in which the audio data and the image data are synchronized, the using quantity data is determined corresponding to the number of image frames outputted. In some cases, the data structured by synchronizing the image data with the audio data may undergo processing such as encryption processing and compression processing in which the signal can not be recognized as an image even by outputting the signal to a monitor TV, etc. as it is. Further, the image data subjected to the encryption processing and the compression processing and the image data undergoing only the compression processing but subjected to no encryption processing may be mixed in a series of data in some cases.

The integration processing means can be incorporated into a portable IC card so formed as to be detachably connected to the apparatus or incorporated into the apparatus itself. Further, the apparatus and the IC card cooperate to constitute an integration processing means.

The hindering means outputs data capable of being perceptible by the user in the form of visible or audible data such as, e.g., alarm picture data or alarm audio data as an item of alarm data. The hindering means, in the middle of outputting the moving picture, may hinder a further output of the image. If the image output is hindered, however, it might be difficult to distinguish whether this hindrance is attributed to a trouble in the apparatus or the fact of reaching a limited quantity of usage.

According to another aspect of the multimedia information outputting apparatus of the present invention, the apparatus deals with information composed of a first item of image data undergoing the processing such as, e.g., the encryption processing and a second item of image data subjected to no such processing. For example, an optical disk or the like defined as a supply medium may store the first and second image data in a state where an identification code is added, or the data may be respectively stored on dedicated image tracks formed on the optical disk. This multimedia information outputting apparatus, if the read-out image data is defined as the second image data, outputs the data without setting the data as an object for the integration of the using quantity. On the contrary, the multimedia information outputting apparatus, only when the read-out data is the first image data, integrates the using quantity data corresponding to the number of outputs of the software constituting the first image data. When outputting the first image data, the processing for restoring all the processes effected on the first image data have to be done. When outputting the second image data, however, only the processing for restoring the processes effected on the second image data may be executed. For instance, the first image data is encrypted and compressed, while the second image data is compressed alone. In this case, for outputting the second image data, there may be executed only the expansion processing to the compression, while the decrypt processing for restoring the encryption is passed.

This multimedia information outputting apparatus has the hindering means for hindering the output when the using quantity data reaches a predetermined using quantity. By the way, if the data is related to a movie, etc., an advertisement picture of the movie is recorded as the second image data on a CD-ROM. With this recording, the data can be outputted even when the processing for restoring the processes effected on only the first image data inhibited, and, besides, the using quantity data is not integrated with the outputting. For this reason, the hindering means may comprise means for generating an alarm data signal for indicating an alarm, means for performing a management to output this alarm data signal during only a fixed period and means for outputting the second image data after outputting the alarm data signal during this fixed period.

The multimedia information outputting apparatus may have a plurality of output modes for the image data. The output modes are, for example, a normal mode of consecutively restoring the image data of a series of frames, a so-called still mode of outputting the images of the frames sampled at a fixed interval and a skip mode of skipping the images having a fixed quantity. These respective modes are made different in terms of a quantity of the data to be outputted. This may be exemplified such that, e.g., the story is not understood simply by the images outputted, or the audio data is not reproduced, and so on. Accordingly, if data using quantity is determined at the same ratio with respect to the quantity of the images outputted and a charge is imposed at the same rate, it may cause a problem in terms of the serviceability. Therefore, the ratio of the using quantity to the image quantity when the integration processing effected may be made variable corresponding to a difference between the modes.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 10 is a flowchart showing the image hindrance signal output processing subroutine executed in step S318 of FIG. 8.

DESCRIPTION OF THE PREFERRED EMBODIMENTS

Embodiments of the present invention will hereinafter be discussed with reference to the drawings.

<Principle of the Embodiment>

Figure 1:
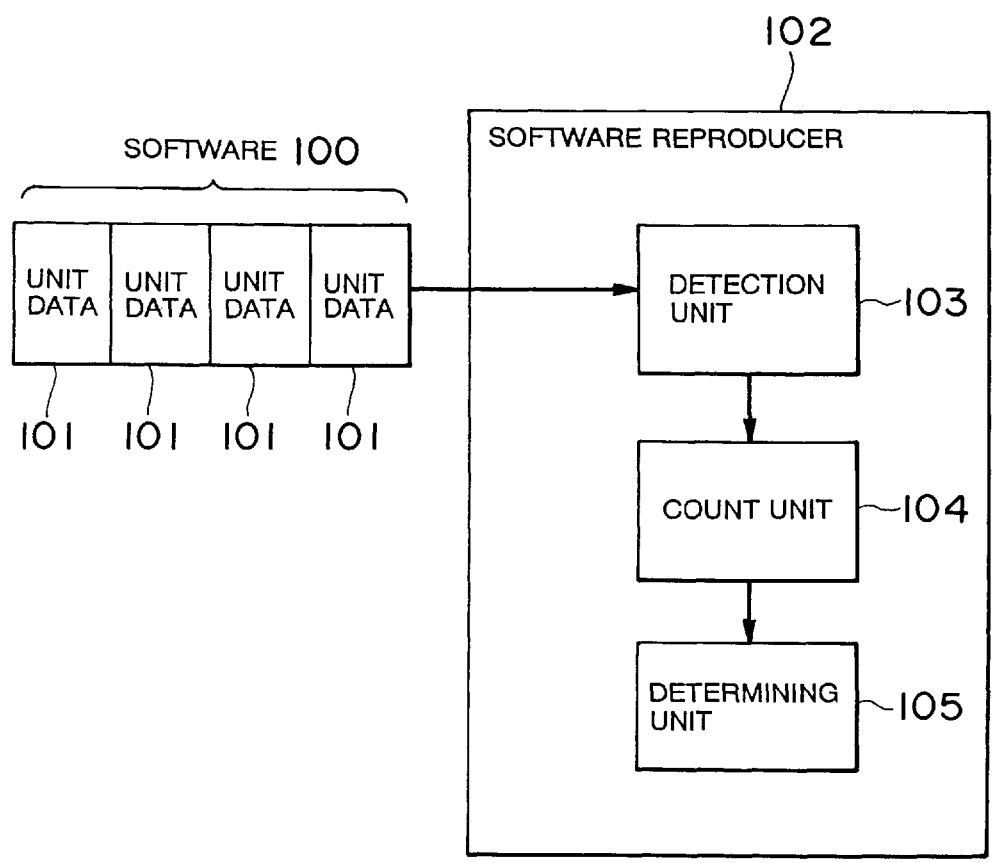
FIG. 1 is a diagram showing the principle of the present invention.

FIG. 1 illustrates the principle of a software using quantity managing apparatus mounted in a software reproducer in accordance with this embodiment. A set of software 100 composed of plural pieces of unit data 101 identifiable from each other is inputted to and used in a software reproducer 102. In the software reproducer 102, the software using quantity managing apparatus is constructed of a detection unit 103, a count unit 104 and a determining unit 105. This detection unit 103, when each item of unit data 101 is used, detects this usage. Each time the detection unit 103 detects this usage of the unit data, the count unit 104 changes a count value. Accordingly, the count value of this count unit 104 corresponds to a total number of usages of the unit data 101. The determining unit 105 determines a using quantity for the usage of the software 100 in accordance with a result of counting by this count unit 104.

According to the thus constructed software using quantity managing apparatus, the using quantity is determined based on the actual total number of usages of the unit data 101 irrespective of the number of usages of the software 100 as a whole and also regardless of a length of time of using the software 100, and an amount of money corresponding thereto can be imposed. Hence, the amount of money imposed can be properly set.

<Construction of the Embodiment>

Figure 2:
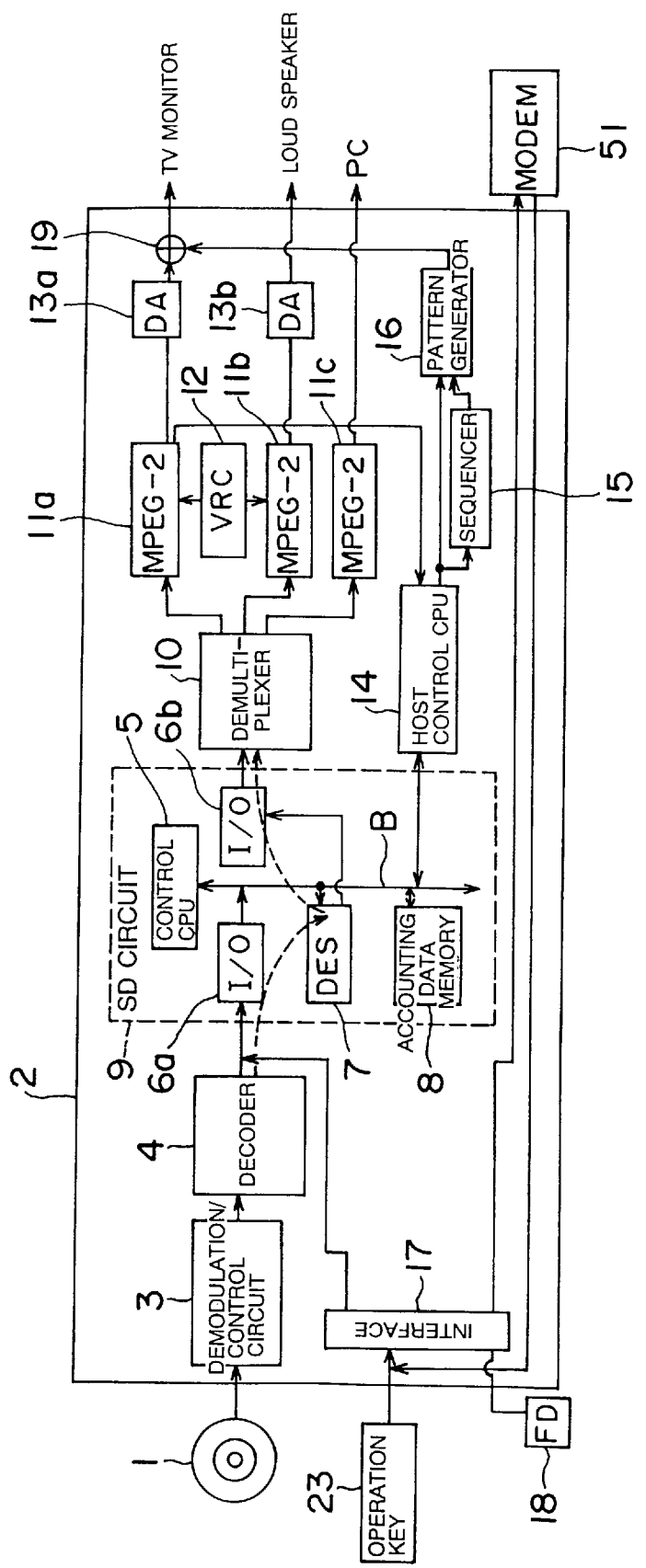
FIG. 2 is a block diagram illustrating a construction of a software reproducer in a first embodiment of the present invention.

FIG. 2 is a block diagram illustrating a construction of a software reproducer employed in a first embodiment of the present invention.

Referring to FIG. 2, a software reproducer 2 is an information processing apparatus capable of using a variety of software offered through media such as a CD-ROM1 and communications via a telephone line. The variety of software take forms of digital data such as audio data, image data, character data and a computer program, etc. Then, contents of the variety of software may be a computer program and data for the program hitherto offered through a floppy disk, a TV program hitherto broadcasted by an analog TV system, a movie program hitherto offered through a video tape and a video disk, music data hitherto offered through radio broadcasting and a compact disk and also still picture data of a photo, etc.

That is, this software reproducer 2 is an information apparatus capable of unitedly dealing with the variety of software offered in the common data format. More specifically, the reproducer 2 incorporates functions to read the multiple software, to execute the computer program, to reproduce the movie program, the TV program (to reproduce video and audio signals) and the music data (to reproduce the audio signal) and also to display the still picture.

Herein, the format of the multiple software stored in the CD-ROM1 will be explained. That is, with respect to the video and audio data, frames are consecutively formed, thus constituting a set of software. Then, the video and audio data frames are A/D converted before being stored in the CD-ROM1. Subsequently, the A/D converted data frames are compressed in conformity with standards of MPEG-2. Herein MPEG-2 indicates video data compression standards recommended by MPEG (Moving Picture Image Coding Experts Group), wherein the basic video format involves CCIR601 standards (4:2:2 format) and HDVT (up to 1920× 1080 lines/frame). The thus compressed data frames are encrypted by use of a predetermined encryption key. On the other hand, with respect to the computer program, the data are directly encrypted without undergoing the compression processing based on MPEG-2 because of the MPEG standards pertaining to the video and audio signals. The data encrypted (and compressed) through such processing are written to the CD-ROM.

The thus processed data stored in the CD-ROM1 are read by an unillustrated drive unit. The data frames read by this unillustrated drive unit are inputted to a demodulation/control circuit 3 of the software reproducer 2. The demodulation/control circuit 3 incorporates a function to demodulate the inputted data frames and transmit these items of data to a decoder 4.

The decoder 4 executes an error correction and a bit rearrangement and transfers the data frames to an SD circuit 9 at a speed of 2 mega bytes/sec at the maximum (1 mega byte/sec on the average). The decoder 4 is, for transferring the data frames, connected to a system bus B within the SD circuit 9 via an I/O (input/output) unit 6a.

An interface unit 17 is also connected via the I/O unit 6a to the system bus B within this SD circuit 9. This interface unit 17 performs I/O processing between the SD circuit 9 and an operation key 23 formed on the external surface of this software reproducer, a floppy disk drive unit 18, and a modem 51. Then, the software data transmitted via a communications network from a software vendor are inputted to the SD circuit 9 by this modem 51 and the interface unit 17. The software supplied through the communications also has the same format as that of the software supplied by the CD-ROM1 and is encrypted (and compressed) beforehand.

Given next is an explanation of the SD (Super Distribution) circuit 9 connected to the decoder 4 and the interface unit 17. The multiple software supplied to the software reproducer 2 is distributed through an easily available medium as the above-mentioned CD-ROM1 and communications, and, therefore, the problem is how an accounting system is constructed to account for an approval for use thereof. The SD circuit 9 is employed for this purpose. That is, the multiple software usable by this software reproducer 2 is distributed in an encrypted status. The variety of encrypted software is sequentially decrypted by the SD circuit 9. Further, the SD circuit 9 subtracts an accounting count value X in synchronism with the use of the software. This accounting count value X is defined as a point written to the SD circuit 9 in accordance with an amount of money prepaid to a software rightful claimant (copyright claimant) by the user. The SD circuit 9 keeps a security of the software by stopping the deciding process when this accounting count value X comes to 0.

Note that this SD circuit 9 is actualized in the form of an IC card which is set detachably inserted into a card slot (e.g., a card slot pursuant to PCMCI1) of the software reproducer 2. Since the IC card form is taken, the SD circuit 9 is easy to transport. Accordingly, the user brings it to a software sales shop (software vendor) or the like, and the accounting count value X may be added in exchange for a payment of the price.

This SD circuit 9 is constructed of a control CPU 5, a DES (Data Encryption Standard) 7, an accounting data memory 8 and I/O units 6a, 6b, which are mutually connected to the bus B.

The control CPU 2 shares with a host control CPU 14 within the software reproducer 2 in terms of control of transferring and receiving the data between the decoder 4, a demultiplexer 10 and the DES 7. Further, a control CPU 5 incorporates a function to control the DES 7 and the accounting data memory 8.

The accounting data memory 8 is a memory for storing the above accounting count value X. Note that the accounting count value X is encrypted within the accounting data memory 8. Hence, it is impossible for persons other than the software rightful claimant to rewrite the accounting count value X by analyzing this accounting data memory 8.

Figure 3:
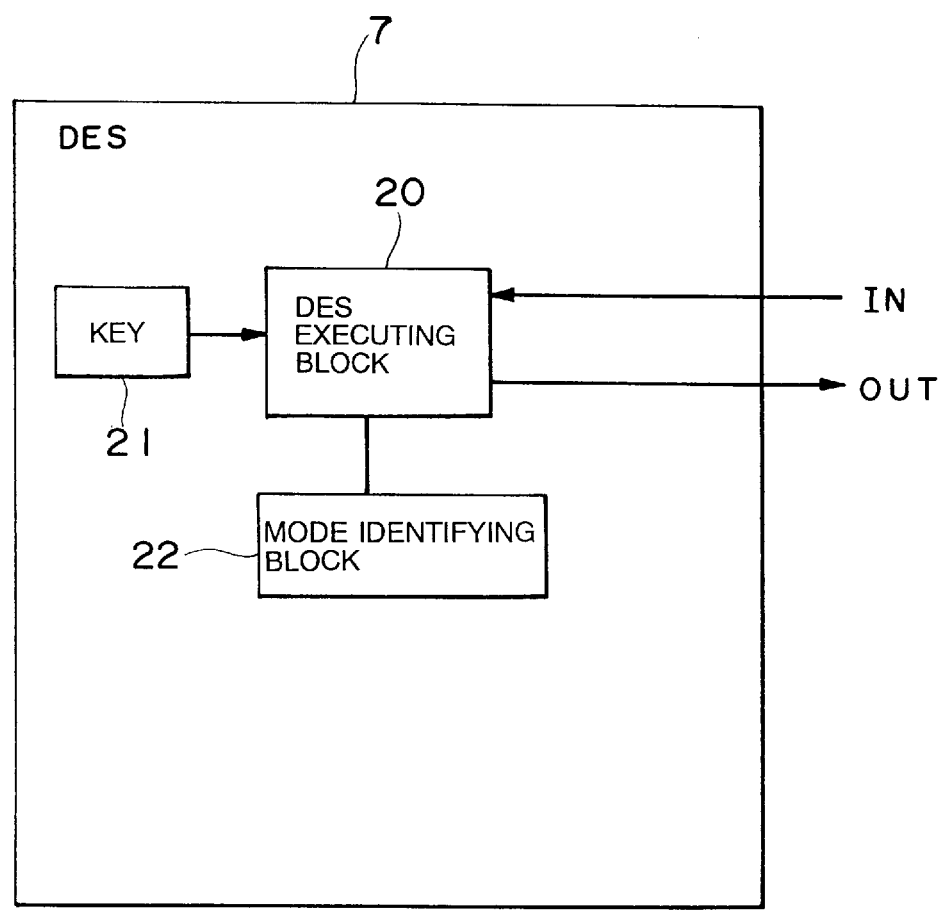
FIG. 3 is a block diagram illustrating internal functions of a DES of FIG. 2.

The DES 7 has a function to decrypt the video/audio data received from the decoder 4 and a function to encrypt user data (a using time and the number of times of using the software) generated with an operation of the software. Note that the user data is informed to the software vendor via the communications network by the modem 51, or the user data are written to the floppy disk 7 which will be collected by the software vendor when the user paying charges next time. FIG. 3 schematically illustrating a configuration of the DES 7. The DES 7 includes, as shown in FIG. 3, a DES executing unit 20 incorporating a function to decrypt input data (IN) on the basis of key data 21 and output this decrypted result in the form of output data (OUT). In accordance with this embodiment, the DES execution unit 20 has a mode identification unit 22. This mode identification unit 22 has a function to select an optimal mode on the basis of a data format, etc. from a plurality of DES modes and inform the DES execution unit 20 of this selected optimal mode. The key data 21 is a cryptanalysis key informed from the software vendor through the communication when the software vendor has confirmed the receipt of the charge for using the software from the software user. Note that this DES 7 may involve the use of an IC chip (46DATA ENCRYPTION STANDARD NIST) made by Phillips Publication Corp.

Referring back to FIG. 2, the data (video data and audio data, etc.) frames decrypted by the DES 7 are transmitted to the demultiplexer 10 outside the SD circuit 9 via the I/O unit 6b. The demultiplexer 10 demultiplexes the audio data frame, the video data frame, and the computer program and the data for the program. Then, the video data frame is outputted to an MPEG expansion circuit (MPEG-2) 11a, while the audio data frame is outputted to an MPEG expansion circuit (MPEG-2) 11b. Then, the computer program and the data for the program are outputted to an MPEG expansion circuit (MPEG-2) 11c.

The MPEG expansion circuits (MPEG-2) 11a, 11b are circuits for expanding the video or audio data frame transmitted in a compressed status on the basis of the MPEG standard to restore the signal possible of output the image or audio. When the data frames are expanded by these MPEG expansion circuits (MPEG-2) 11a, 11b, a VRC circuit 12 takes synchronism of the outputs of the circuit 11a, 11b. That is, the MPEG expansion circuits (MPEG-2) 11a, 11b output the expanded data frames in synchronism with synchronous signals outputted from the VRC circuit 12. Note that the MPEG expansion circuits 11 may involve the use of an IC chip (ISO/IEC CD 13818'1-3).

The output from the MPEG expansion circuit for video data (MPEG-2) 11a is converted into an analog signal by a D/A converter 13a. This analog signal is outputted to an unillustrated TV monitor unit connected to the software reproducer 2 via an adder circuit 19. Further, the output from the MPEG expansion circuit for audio data (MPEG-2) 11b is converted into an analog signal by a D/A converter 13b. This analog signal is outputted directly to an unillustrated loud speaker connected to the software reproducer 2. On the other hand, the computer oriented program and data for the program directly passes through the MPEG expansion circuit (MPEG-2) 11c and is outputted to an unillustrated personal computer connected to the software reproducer 2.

The MPEG expansion circuit for video data (MPEG-2) 11a outputs a completion-of-frame-expansion signal each time an expanding process of the individual compressed data frame is completed. This completion-of-frame-expansion signal is received by the host control CPU 14 of the software reproducer 2 and then used for controlling the accounting. That is, the host control CPU 14, when receiving this completion-of-frame-expansion signal, cooperates with a control CPU 5, which is provided in the SD circuit and connected to the CPU 14 via the bus in subtracting the accounting count value X shown in an accounting data memory 8. The host control CPU 14 controls an output hindrance when the accounting count value X is 0. Note that the host control CPU 14 is a processor for controlling the software reproducer 2 as a whole, as well as the accounting.

Figure 4:
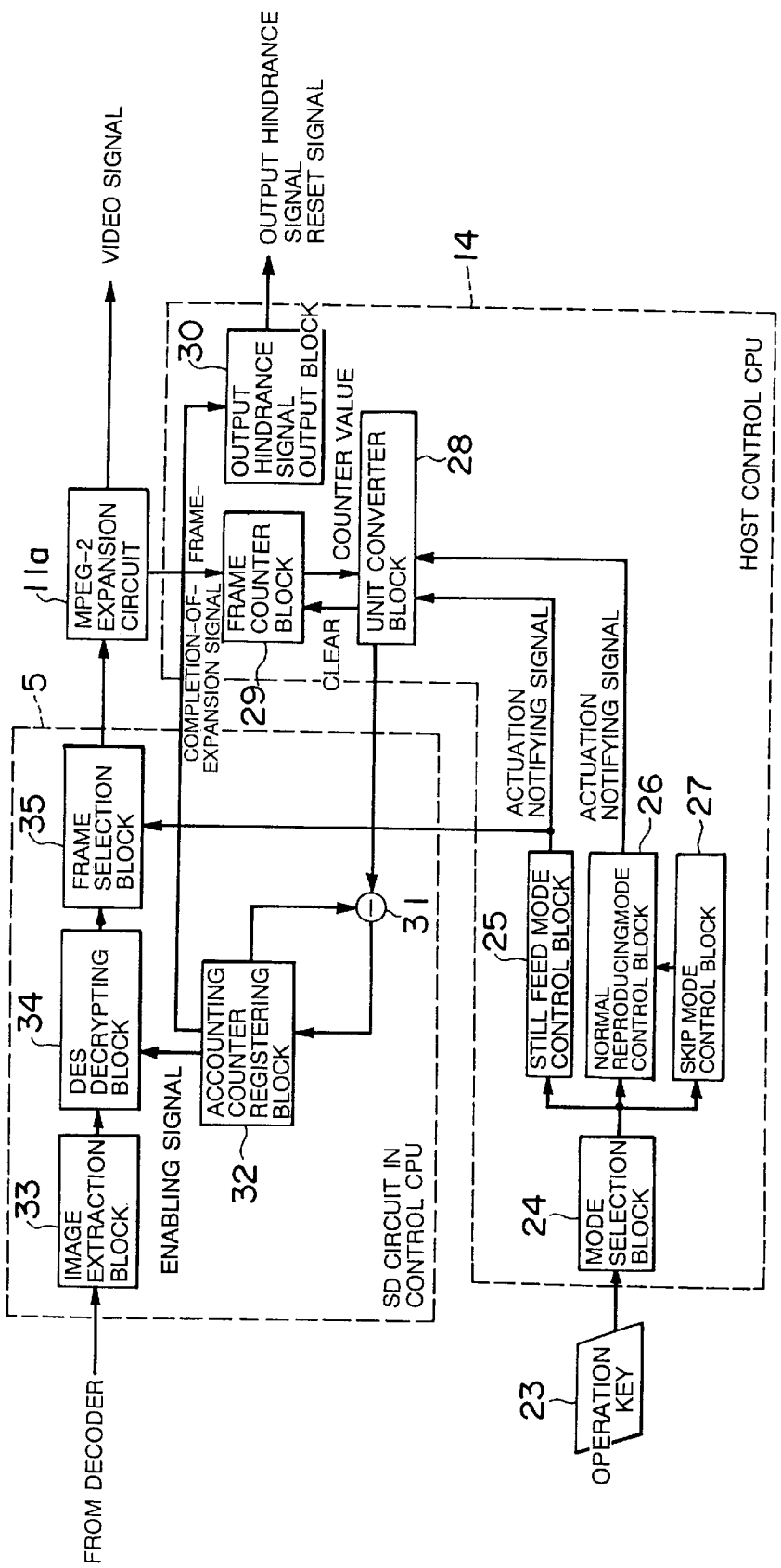
FIG. 4 is a block diagram illustrating functions of control CPUs 5 and 14 of FIG. 2.
Figure 5:
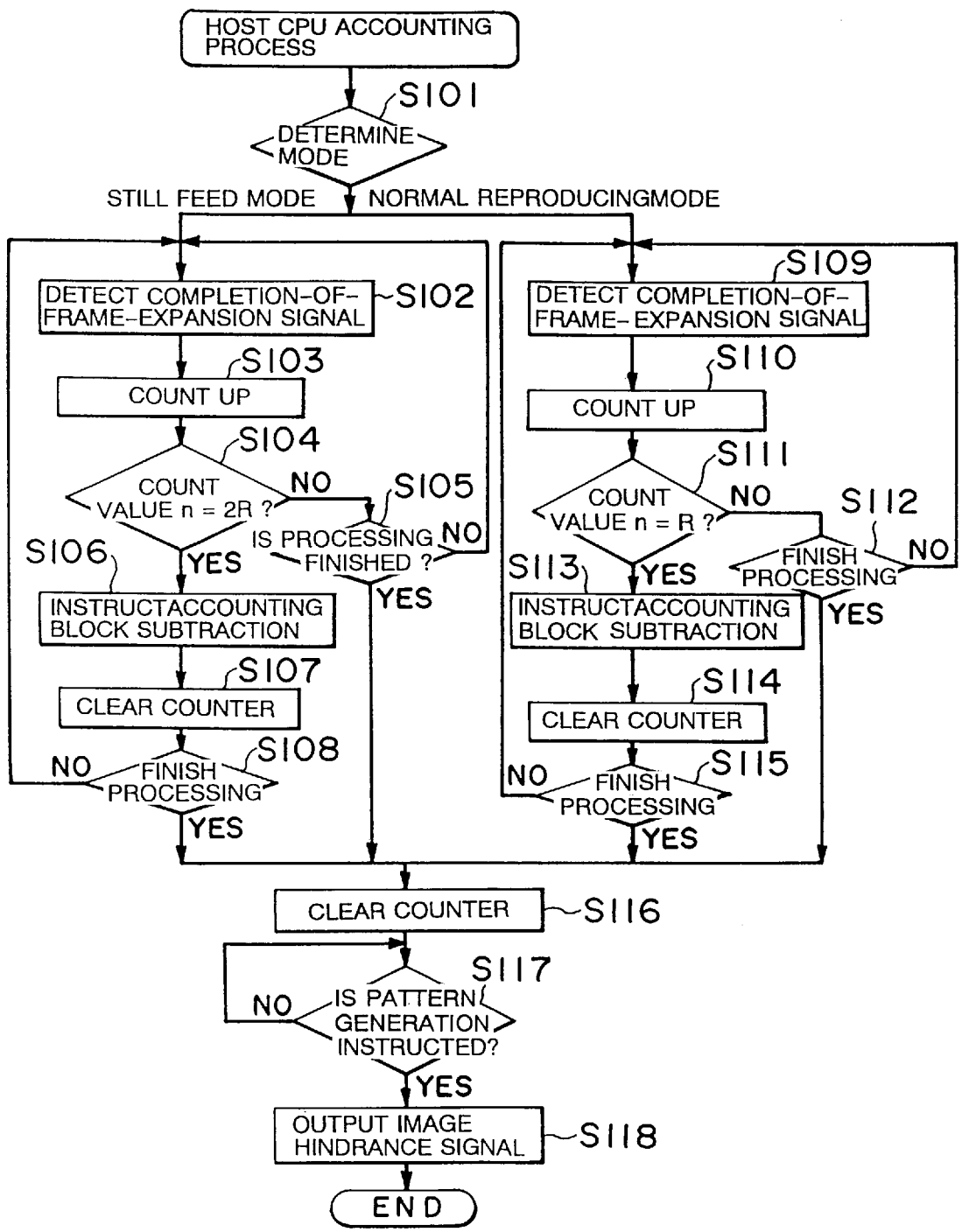
FIG. 5 is a flowchart showing the processing executed by the control CPU 14 of FIG. 2.

The following is a detailed discussion on specific contents of the accounting process executed by this host control CPU 5 and the control CPU 5 within the SD circuit 9 with reference to FIGS. 4 and 5.

FIG. 4 is a diagram illustrating blocked functions of these two control CPUs 14 and 5. Referring to FIG. 4, the host control CPU 14 is constructed of a frame counter block 29 for receiving the completion-of-frame-expansion signal transmitted from the MPEG expansion circuit 11a and a mode selection block 24 for receiving an input (via the interface 17, the I/O unit 6a and the bus B) from an operation key 23 provided on the external surface of the software reproducer 2. The host control CPU 14 is also constructed of a skip mode control block 27 for receiving a signal from this mode selection block 24, a normal reproducing mode control block 26 for receiving signals from the mode selection block 24 and the skip mode control block 27 and a still feed mode control block 25 for receiving a signal from the mode selection block 24. The host control CPU 14 is further constructed of a unit converter block 28 for receiving signals from the ordinary reproducing mode control block 26, the still feed mode control block 25 and the frame counter block 29 and an image hindrance signal output block 30 for receiving a signal from the control CPU 5 of the SD circuit 9. On the other hand, the control CPU 5 of the SD circuit 9 is constructed of an image extraction block 33 for receiving a signal from the decoder 4, a DES decrypting block 34 for receiving a signal from the image extraction block 33 and a frame selection block 35 for receiving signals from the still feed mode control block 25 as well as from the DES decrypting block 34 and outputting the signals to the MPEG expansion circuit 11a. The control CPU 5 is also constructed of a subtracter block 31 for receiving a signal from the block converter block 28 and an accounting counter registering block 32 for receiving a signal from the subtracter block 31 and outputting the signals to the DES decrypting block 34, the image hindrance signal output block 30 and the subtracter block 31. The above functional blocks will hereinafter be described.

The mode selection block 24 detects that there is depressed one of a "regenerative key", a "still feed key" and a "skip feed key" that constitute the operation keys 23. The mode selection block 24 then starts up one of the skip mode control block 27, the normal reproducing mode control block 26 and the still feed mode control block 25 in accordance with the depressed key. Note that these respective control blocks 25, 26, 27 are stopped upon depressing a "stop key" partly constituting the operation keys 23. The normal reproducing mode control block 26 performs the control of outputting all the frames transmitted to the SD circuit 9 at a predetermined interval in sequence. When the normal reproducing mode control block 26 is started up, a start-up notifying signal is inputted to the unit converter block 28 for a duration of the actuation of the control block 26. The skip mode control block 27 performs the control to intermittently actuate the normal reproducing mode control block 26. The still feed mode control block 25 effects the control to select and output the frame transmitted to the SD circuit 9 in accordance with a predetermined algorithm. In the still feed mode, the video data are displayed by way of a fast motion picture of skipped frames (step search). When starting up the still feed mode control block 25, an actuation notifying signal is transmitted to the unit converter block 28 and the frame selection block 35 for a duration of the actuation of the control block 25.

On the other hand, when actuating the normal reproducing mode control block 26 or the still feed mode control block 25, an unillustrated CD-ROM drive, a demodulation/control circuit 3 and the decoder 4 are started up (alternatively, the data frame is down-loaded through the modem 51), thereby transmitting the data frame to the image extraction block 33. The image extraction block 33 extracts only the video data frame from the transmitted data frames and transfers the extracted data frame to the DES decrypting block 34.

This DES decrypting block 34 actuates the DES 7 and decrypts the transferred video data frame. The video data frame decrypted by the DES decrypting block 34 is inputted to the frame selection block 35.

The frame selection block 35, for a duration of receiving the actuation notifying signal from the still feed mode control block 25, selects some of the received video data frames in accordance with the predetermined algorithm and output them to the MPEG expansion circuit 11a. As an algorithm for this video data frame selection, there are selectively used, for example, algorithms of selecting only a frame in which a predetermined flag is set, selecting one frame at an interval of a predetermined number of frames and selecting one frame at a predetermined time interval. Note that the frame selection block 35 outputs all the video data frames received to the MPEG expansion circuit 11a for a duration of receiving no actuation notifying signal from the still feed mode control block 25.

The MPEG expansion circuit for video data 11a receiving the video data frame effects an expanding process on the received video data frames one by one. The MPEG expansion circuit 11a, each time the circuit 11a completes the expanding process on the individual frame, outputs the video signal to the D/A converter 13a and transmits the completion-of-frame-expansion signal to the frame counter block 29.

The frame counter block 29 is a counter for counting up a count value n by 1 each time the block 29 receives the completion-of-frame-expansion signal. The frame counter block 29 notifies the unit converter block 28 of this count value n at all times. Further, the frame counter block 29, when receiving a clear signal from the unit converter block 28, clears the count value n to 0.

The unit converter block 28 compares the count value n of which the frame counter block 29 informs with a predetermined reference value for a duration of receiving the actuation notifying signal from the normal reproducing mode control block 26 or the still feed mode control block 25. This predetermined reference value is set to R (e.g., R=100,000,000) when receiving the actuation notifying signal from the normal reproducing mode control block 26 but to 2R when receiving the actuation notifying signal from the still feed mode control block 25. Then, the unit converter block 28, when the count value n reaches the predetermined reference value, outputs an accounting unit subtraction instruction to the subtracter block 31. More specifically, the unit converter block 28 outputs a substraction value "1" to the subtracter block 31. Note that the unit converter block 28, when the actuation notifying signal stopped or when outputting the accounting unit substraction instruction, outputs the clear signal to the frame counter block 29.

The accounting counter registering block 32 reads the accounting count value X from the accounting data memory 8 and notifies the subtracter block 31 of this value. The accounting counter registering block 32, at the same time, updates the accounting count value X of the accounting data memory 8.

The subtracter block 31, when the accounting unit substraction instruction is given from the unit converter block 28, decrements the accounting count value X by 1, of which the accounting counter registering block 32 notifies. Subsequently, the subtracter block 31 notifies the accounting counter registering block 32 of this new decremented accounting count value X (X=X−1). The accounting counter registering block 32 overwrites the new accounting count value X (X=X−1) of which the subtracter block 31 notifies on the accounting data memory 8.

The accounting counter registering block 32 determined whether or not the accounting count value X written to the accounting data memory 8 becomes 0 (unusable value).

When the accounting count value X comes to 0, the accounting counter registering block 32 gives an instruction of generating a pattern to the image hindrance signal output block 30. At the same time, the accounting counter registering block 32 issues a command of stopping the decrypting by the DES 7 and thus stops an enabling signal with respect to the DES decrypting block 34. Note that the accounting counter registering block 32, if the software vendor rewrites the accounting count value X in the accounting data memory 8 from "0" to a value "1" or larger, outputs the enabling signal to the DES decrypting block 34 and notifies the image hindrance output block 30 of this effect. The unit converter block 28, the subtracter block 31 and the accounting counter registering block 32 are combined to constitute a determining device for determining the amount of imposed money.

The image hindrance signal output block 30, when the pattern generating instruction is given from the accounting counter registering block 32, outputs the image hindrance signal. Further, the image hindrance signal output block 30, if the accounting counter registering block 32 gives a notice that the accounting counter value X>0, outputs the reset signal.

A flow of processing executed by the respective control CPUs 5, 14 described above will be explained with reference to flowcharts of FIGS. 5 and 6.

FIG. 5 is the flowchart showing a flow of the accounting process executed by the host control CPU 14 of the software reproducer 2. This process starts with detecting that one of the "regenerative key", the "still feed key" and the "skip feed key" constituting the operation keys 23 is depressed. In initial step S101, the host control CPU 14 determines an image display mode to be executed based on a type of the depressed key. That is, when the "regenerative key" or the "skip feed key" is depressed, the host control CPU 14 determines it as a "normal reproducing mode". To the contrary, when the "still feed key" is depressed, the host control CPU 14 determines it as a "still feed mode". The processes subsequent thereto are different depending on the reproducing modes determined.

In the case of the "still feed mode", the completion-of-frame-expansion signal from the MPEG expansion circuit 11a is detected in step S102. When detecting the completion-of-frame-expansion signal, the processing proceeds to step S103, wherein the count value n of the frame counter block 29 is counted up by 1.

In subsequent step S104, the CPU 14 determines whether or not the count value n reaches a reference value 2R (e.g., 2R=200,000,000). Then, if the count value n does not reach the reference value 2R, in step S105, the CPU 14 determines whether the accounting process is finished or not. This determination is performed based on whether or not the actuation notifying signal is received from the still feed mode control block 25. That is, if the actuation notifying signal is not received, the processing proceeds to step S116 by determining that the accounting process is to be finished. Whereas if the actuation notifying signal is received, the processing goes back to step S102 by determining that the accounting process is to be continued.

On the other hand, when determining that the count value n reaches the reference value 2R in step S104, the processing proceeds to step S106. In step S106, the accounting unit substraction instruction is given to the control CPU 5 of the SD circuit 9.

In subsequent step S107, the count value n of the frame counter block 29 is cleared to 0.

In subsequent step S108, as in the same way with step S105, the CPU 14 determines whether or not the accounting control process is finished. Then, when determining that the accounting control process continues, the processing is returned to step S102. Contrastingly when determining that the accounting control process is to be finished, the processing proceeds to step S116.

Contrastingly in the case of the "normal reproducing mode", the completion-of-frame-expansion signal from the MPEG expansion circuit 11a is detected in step 109. When detecting the completion-of-frame-expansion signal, the processing proceeds to step S110, wherein the count value n of the frame counter block 29 is counted up by 1.

In subsequent step S111, the CPU 14 determines whether or not the count value n reaches a reference value R (e.g., R=100,000,000). Then, if the count value n does not yet reach the reference value R, in step S112, the CPU 14 determines whether the accounting process is finished or not. This determination is effected based on whether or not the actuation notifying signal is received from the normal reproducing mode control block 26. That is, if the actuation notifying signal is not received, the processing proceeds to step S116 by determining that the accounting process is to be finished. Whereas if the actuation notifying signal is received, the processing goes back to step S109 by determining that the accounting process is to be continued.

On the other hand, when determining that the count value n reaches the reference value R in step S111, the processing proceeds to step S113. In step S113, the accounting unit substraction instruction is given to the control CPU 5 of the SD circuit 9.

In subsequent step S114, the count value n of the frame counter block 29 is cleared to "0".

In subsequent step S115, as in the same way with step S112, the CPU 14 determines whether or not the accounting control process is finished. Then, when determining that the accounting control process continues, the processing is returned to step S109. Contrastingly when determining that the accounting control process is to be finished, the processing proceeds to step S116.

In any case, in step S116, the count value n of the frame counter block 29 is cleared to "0".

Subsequently, the CPU 14 waits for the pattern generating instruction given from the control CPU 5 of the SD circuit 9 in step S117. Then, when the pattern generating instruction is given therefrom, the video hindrance signal is outputted in step S118. After the above, this accounting process is finished.

Figure 6:
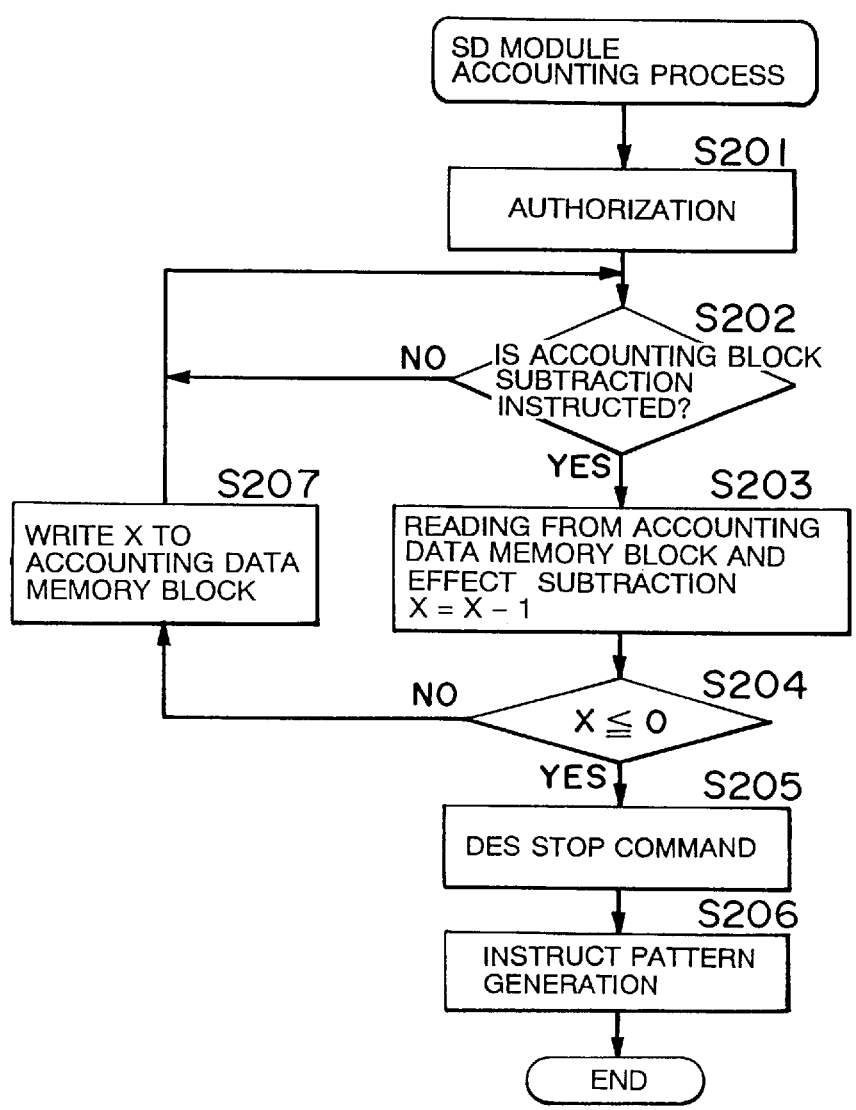
FIG. 6 is a flowchart showing the processing executed by the control CPU 5 of FIG. 2.

FIG. 6 is a flowchart showing a flow of accounting process executed by the control CPU 5 of the SD circuit 9.

This process starts when the IC card incorporating the SD circuit 9 is set in the software reproducer 2. Then, in initial step S201, the control CPU 5 executes authorization. This authorization implies checking the control CPUs 14, 5 each other when setting the SD circuit 9.

Subsequently, the control CPU 5 checks whether or not the accounting unit subtraction instruction is received from the host control CPU 14 in step S202. Then, when receiving no accounting unit subtraction instruction, the check in this step S202 is repeated.

Whereas if the accounting unit subtraction instruction is received, in step S203, the accounting count value X is read from the accounting data memory 8. Subsequently, "1" is subtracted from read accounting count value X, and this subtracted value (X−1) is set as a new accounting count value X.

In subsequent step S204, the CPU 5 determines whether the new accounting count value X is 0 or under. Then, if the new accounting count value X is more than 0, the processing proceeds to step S207. In step S207, the new accounting count value X is written to accounting data memory 8. Next, the processing is returned to step S202.

Whereas if the accounting count value X is 0 or under, there is issued a decryption stop command with respect to the DES 7 in step S205. Accordingly, the DES 7 performs no decrypting processing with respect to the image data frame thereafter, and, hence, only the encrypted image data frame is transmitted to the MPEG expansion circuit 11a. Therefore, only noises are outputted from the MPEG expansion circuit 11a. In subsequent step S206, the pattern generating instruction is given to the host control CPU 14. Thereafter, this processing is ended.

Note that a reexecution of the processing shown in FIG. 6 entails such an operation that the SD circuit 9 is temporarily demounted from the software reproducer 2, the software vendor writes the accounting count value X in the accounting data memory 8 in exchange for a payment of the charge for using the software, and the SD circuit 9 has to be installed again in the software reproducer 2.

Referring back to FIG. 2, there will be explained a configuration of the usage hindrance device for superimposing image patterns on the video signal displayed on the TV monitor in accordance with the image hindrance signal given from the host control CPU 14.

The output hindrance signal from the host control CPU 14 is inputted to a pattern generator 16 and a sequencer 15. This sequencer 15 outputs a signal switched ON/OFF in a predetermined sequence from a timing at which the video hindrance signal is received. That is, as illustrated in FIG. 7(c), the sequencer 15 switches OFF the output before receiving the video hindrance signal but switches ON/OFF the output several times after receiving the video hindrance signal. Thereafter, the sequencer 15 continues the output ON. The output signal of this sequencer 15 is inputted to the pattern generator 16.

The pattern generator 16, when receiving the image hindrance signal, generates image pattern data for displaying the character data to induce an attention with the software user as "Accounting Count value =0", for example. The pattern generator 16 outputs the thus generated image pattern data only when the output signal of the sequencer 15 is turned ON. The image pattern data outputted from this pattern generator 16 is inputted to the adder circuit 19.

The adder circuit 19 superimposes the image pattern data outputted from the pattern generator 16 on an analog video signal outputted from the D/A converter for video data 13a and outputs the superimposed signals to the TV monitor unit. Accordingly, when the image pattern signal transmitted from the pattern generator 16 is switched OFF, the analog video signal outputted from the D/A converter 13a is outputted as it is. Whereas if the image pattern signal is switched ON, there is outputted such a video signal in which the image pattern is superimposed on the analog video signal outputted from the D/A converter 13a.

Note that the sequencer 15 and the pattern generator 16 stop outputting when a reset signal is transmitted from the host control CPU 14.

<Operation of the Embodiment>

Now, it is assumed that the "regenerative key" partly constituting the operation keys 23 is depressed. Then, these audio and video data frames related each other so that these frames are outputted in synchronism with each other are transmitted to the SD circuit 9 from the CD-ROM1. These audio and video data frames are decrypted by the DES 7 on condition that the accounting count value X in the accounting data memory 8 is 1 or larger.

The SD circuit 9 inputs all the decrypted audio and video data frames in sequence to the demultiplexer 10. The video data frame demultiplexed by the demultiplexer 10 is inputted to the MPEG expansion circuit for video data 11a, while the audio data frame is inputted to the MPEG expansion circuit for video data 11b. Each of the MPEG expansion circuits 11a, 11b expands the received frames one by one in sequence and outputs the expanded frames to the D/A converters 13a, 13b.

Each time the MPEG expansion circuit for video data 11a completely expands the individual video data frame, the completion-of-frame-expansion signal is inputted to the host control CPU 14. This host control CPU 14 counts up the number of receiving the completion-of-frame-expansion signals and makes the CPU 5 in the SD circuit 9 decrement the accounting count value X in the accounting data memory 8 each time this count value n reaches the predetermined reference value R.

Thus, in accordance with this embodiment, a charge is imposed corresponding to the number of outputted frames even if the user watches any section of a moving picture or even if the user repeatedly watches the same section of a moving picture (e.g., movie). Further, if the picture is stopped, a new frame is not outputted, and, therefore no charge is imposed. Accordingly, no irrational situation is produced as seen in the conventional accounting method, and a proper charge is imposed. As a result, there is no necessity for adding uncollectible charges for use to the charge for one use beforehand, and hence the charges for use can be set to a comparatively low amount of money.

Note that when depressing the "still feed key" partly constituting the operation keys 23, the SD circuit 9 outputs, to the demultiplexer 10, only the video data frames selected in a skipping manner on the basis of the predetermined algorithm and the audio data frames corresponding thereto.

The video data frames demultiplexed by the demultiplexer 10 are inputted to the MPEG expansion circuit for video data 11a, while the audio data frames are inputted to the MPEG expansion circuit for video data 11b. When the MPEG expansion circuit for video data 11a completes the expansion processing on the individual video data frame, the completion-of-frame-expansion signal is inputted to the host control CPU 14. In this case, however, the host control CPU 14 does not make the CPU 5 in the SD circuit 9 decrement the accounting count value X in the accounting data memory 8 till the count value n of the number of receiving the completion-of-frame-expansion signals reaches a value that is twice the reference value R. That is, the accounting count value X is decremented every time the count value n reaches 2R.

Accordingly, even when the same number of frames are outputted within the same period of time, the charge imposed in the step mode is generally a half of the charge imposed at the normal reproducing mode. Hence, a partiality to the case of the normal reproduction is generally obviated, and, on the other hand, a charge for outputting the data can be also imposed. Consequently, an impartial profit adjustment can be made between the software rightful claimant and the user.

Figure 7:
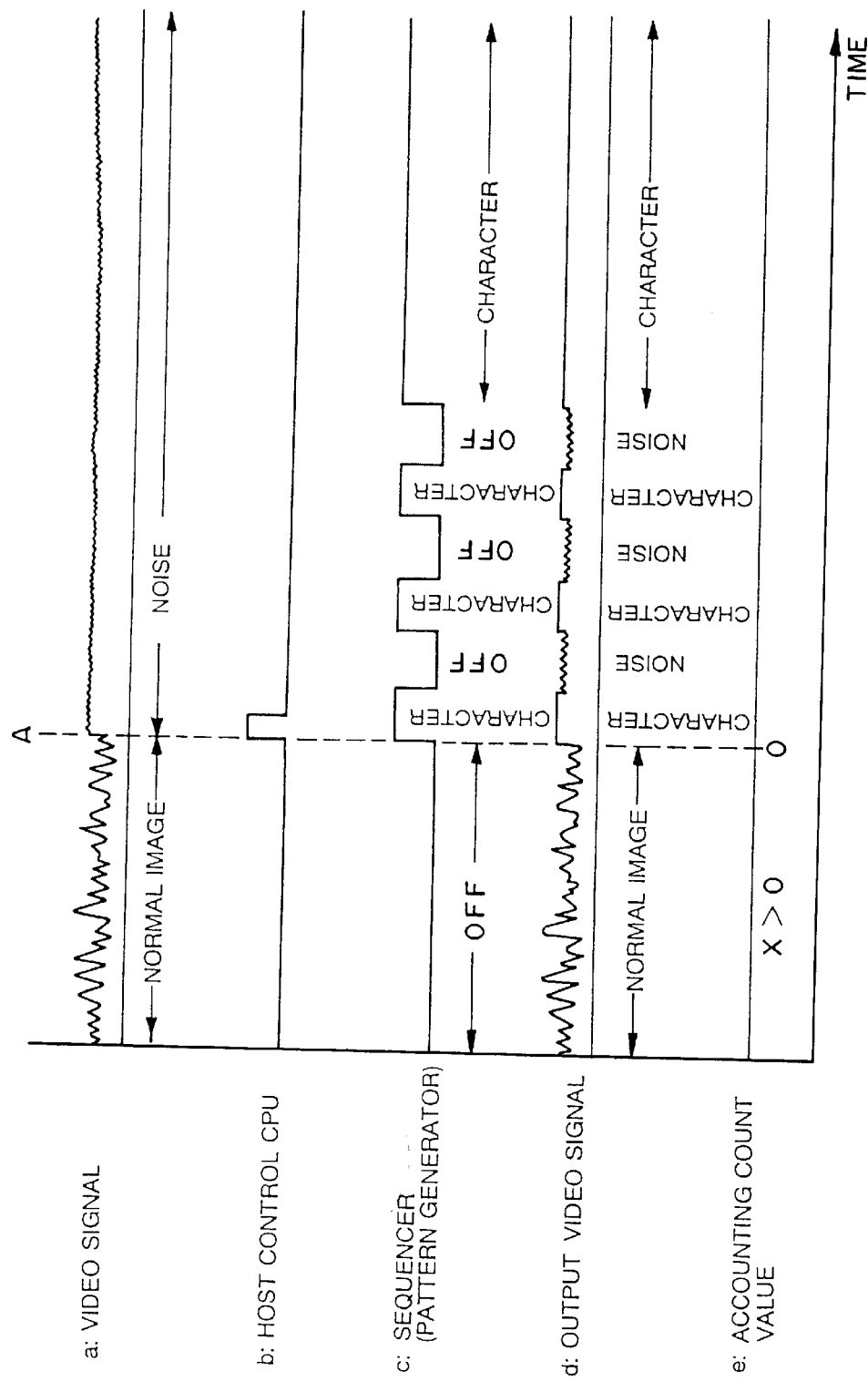
FIG. 7 is a time chart showing a signal status of each unit of FIG. 2.

As a result of decrementing the accounting count value X in this way, the accounting count value X becomes 0. In this case, a signal status in each unit goes as illustrated in FIG. 7. Referring to FIG. 7(e), there is shown that the accounting count value X becomes 0 at a timing "A".

After the accounting count value X has become 0, the decrypting by the DES 7 is stopped, and therefore the A/D converter for video data 13a only outputs the noises after the timing "A" (see FIG. 7(a)).

The host control CPU 14, when the accounting count value X comes to 0 at the timing "A", outputs the pulse-like image hindrance signal (see FIG. 7(b)).

Hereupon, the sequencer 15 outputs the signal repeatedly switched over alternately in ON/OFF statuses within a fixed period of time since the image hindrance signal is received and, after this fixed period of time has elapsed, continuously outputs the signal kept in the ON status (see FIG. 7(c)).

The pattern generator 16 receives the image hindrance signal (b) and the output signal of the sequencer 15 and thereby outputs the character pattern data (video signal for indicating a character "Accounting Count value=0") only at a timing when the output signal of this sequencer 15 is switched ON. Hence, a timing at which the pattern generator 16 outputs the character pattern data is as shown in FIG. 7(c).

The adder circuit 19 for superimposing the video signal (a) and the character pattern data (c) outputs the normal video signal (a) as far as an accounting count value X(e) is larger than 0. Then, during a fixed period from the timing "A" when the accounting count value X(e) becomes 0, the character pattern video signal and the noises are repeatedly alternately given forth. Then, after this fixed period has elapsed, the character pattern video signal is continuously given forth (see FIG. 7(d)).

Therefore, the software user watching the unillustrated TV monitor is able to recognize that the noises are caused not by a failure of the apparatus but by the fact that the accounting count value becomes 0. As a result, the software user is prompted to pay the charge for use to the software vendor as a compensation for adding the accounting count value X by removing the SD circuit 9 out of the software reproducer 2.

Second Embodiment

A second embodiment of the present invention has the same hardware architecture as that in the first embodiment but is different in terms of only contents of the programs executed by the control CPU 5 and the host control CPU 14. An explanation of the hardware architecture will be therefore omitted.

In accordance with the second embodiment, only the CD-ROM1 on which the video data are recorded is employed as a medium of the distribution. It is assumed that advertisement video data undergoing not encryption processing but an image compression coding process by the MPEG2 are stored in predetermined areas identifiable by the user of this CD-ROM1. It is also assumed that the video data subjected to the encryption processing and the MPEG2 image compression coding process as well are stored in other predetermined areas of this CD-ROM1.

Figure 8:
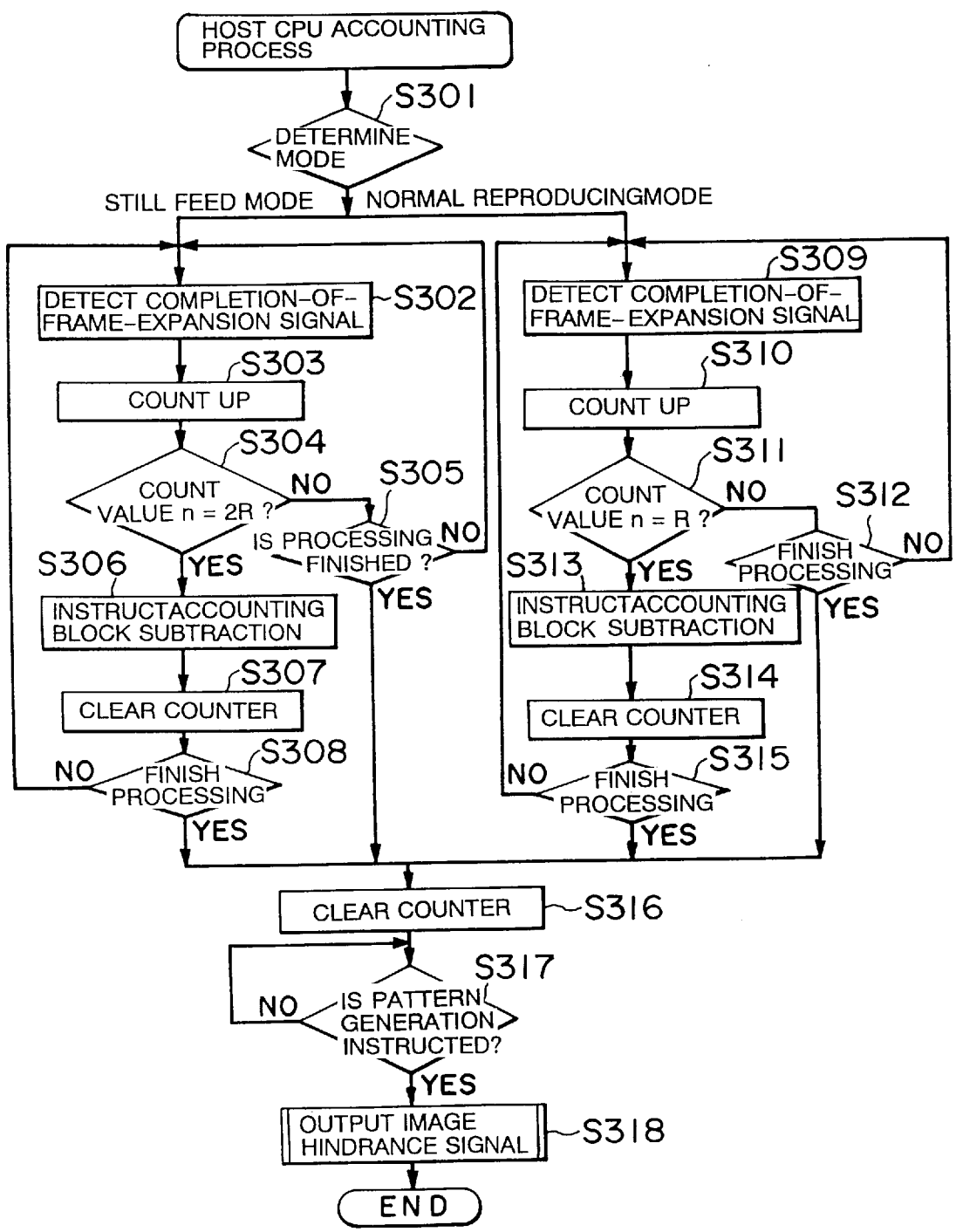
FIG. 8 is a flowchart showing the processing executed by the control CPU 14 in a second embodiment of the present invention.

FIG. 8 is a flowchart showing the content of the program executed by the host control CPU 14. Processes in steps S301–S317 of FIG. 8 are the same as those in steps S101–S117 of FIG. 5. In the second embodiment, however, if the pattern generating instruction is given, a video hindrance signal output processing subroutine shown in FIG. 10 is executed in step S318.

Figure 9:
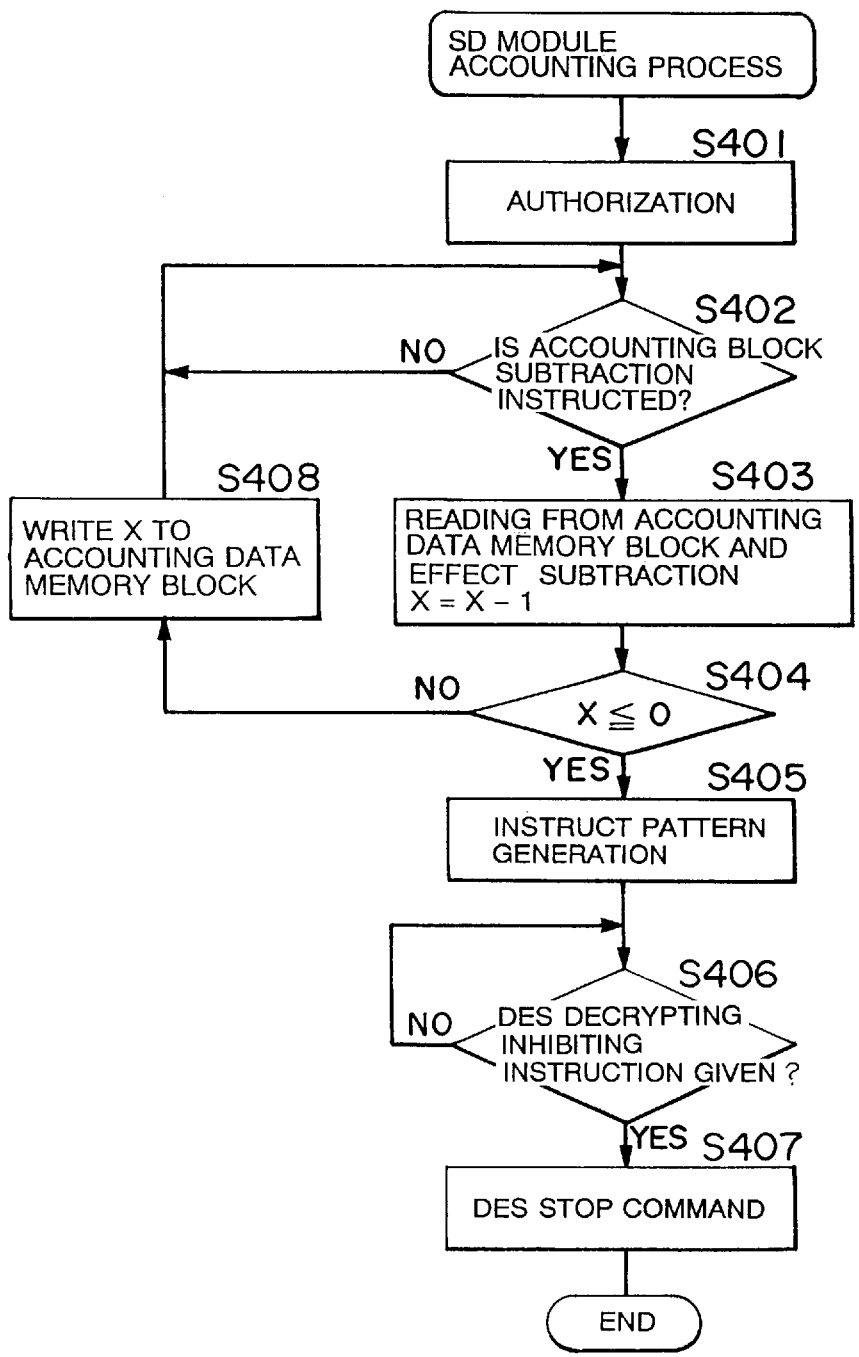
FIG. 9 is a flowchart showing the processing executed by the control CPU 5 in the second embodiment of the present invention.

On the other hand, FIG. 9 is a flowchart showing the content of the program executed by the control CPU 5 within the SD circuit 9. Processes in steps S401–S404 and S408 of FIG. 9 are the same as those in steps S201–S204 and S207 of FIG. 6. In accordance with the second embodiment, however, when the accounting count value X becomes 0 or under, the pattern generating instruction is immediately issued in step S405. Then, there is waited a DES decrypt inhibiting instruction given from the host control CPU 14 in step S406. A DES stop command is generated in step S407 when the instruction given.

Given hereinafter is an explanation of the video hindrance signal output processing subroutine of FIG. 10, which is to be executed in step S318 of FIG. 8. In first step S501, of FIG. 10, the host control CPU 14 outputs the image hindrance signal and thereby starts up the sequencer 15. Then, the CPU 14 sets the pattern generator 16 in a generation enable status. With this processing, the pattern generator 16 generates a fixed item of image pattern data on the basis of a start-up signal generated with a predetermined period from the sequencer 15. This item of image pattern data is binary image data but is constructed of data for displaying an alarm sentence on the monitor screen of the TV monitor unit when the TV monitor unit is connected. The image pattern data is superimposed on the decrypted image output signal in the adder circuit 19.

In next step S502, a reference time of a timer is set to 15 sec, and a time measurement is started. In subsequent step S503, the counter in an unillustrated work area is incremented. An initial value of this counter is 0. In next step S504, whether or not the value of this counter is "5" or greater is determined. If it is smaller than "5", there is a wait till the elapse time measured by the timer reaches 15 sec. in step S505, and the processing returns to step S501 wherein the image hindrance signal is again outputted. Whereas if the value of the counter is equal to or larger than five times, the processing exits this loop from step S504, and the counter is cleared in step S506.

With the operations performed so far, a hindrance video signal with a period of 15 sec. is outputted five times. Accordingly, the pattern generator 16 effects repetitions of intermittent and consecutive outputting of the character pattern data for displaying the alarm sentence five times with the period of 15 sec. The adder circuit 19 superimposes this item of character pattern data on the normal video output signal. As a result, the software user watching the TV monitor device for displaying this signal recognizes that the accounting count value becomes 0 and demounts the SD circuit 9 out of the software reproducer 2. The software user then pays the charge for use to the software vendor in exchange of an addition of the accounting count value X.

In next step S507, the DES decrypting inhibiting instruction for stopping the encrypting function is issued to the control CPU 5 within the SD circuit 9 (see S406). However, the MPEG2 expansion circuit for video data 11a is kept in the operable status as it is. In consequence of executing step S407 of FIG. 9 which is to be carried out in accordance with this step, the control CPU 5 in the SD circuit 9 transfers the data supplied from the decoder 4 directly to an interface 6b from an interface 6a through no intermediary of a DES 7.

In next step S508, a drive of the CD-ROM1 is accessed via an unillustrated bus, and the data is read from the areas for the data undergoing no encryption processing. The thus read data is supplied to the MPEG2 expansion circuit for video data 11a via the demodulation circuit 3, the decoder 4, the interfaces 6a, 6b and the demultiplexer 10. The advertisement video data expanded by the MPEG2 expansion circuit for video data 11a is converted by the D/A converter 13a into the analog signal. That is, after outputting alarm sentences in the form of images a fixed number of times, it follows that only the advertisement data stored in the unencrypted status in the CD-ROM1 is read and then outputted.

In subsequent step S509, there is checked whether the end key partly constituting the operation keys 23 is depressed or not. When the "end key" is not yet depressed, the read processing of the advertisement images in step S508 is repeated. When the "end key" is depressed, this subroutine comes to an end, and the processing returns to steps of FIG. 8.

Note that the clear signal continues to be inputted to the frame counter block 29 (FIG. 4) in the control CPU 14 during a period of the execution of the image hindrance signal output processing described above, and the frame counter block 29 thereby stops counting.

According to the present invention, the proper charge can be imposed even in a case where the software is used in the abnormal using mode. Further, if the amount of imposed money is determined based on the using mode of the software, the proper charge can be imposed on the usage that is not in the normal using mode for following up the story.

What is claimed is:

1. A software usage measurement processor for obtaining usage data of software which contains plural items of unit data indentifiable from each other, said processor comprising:

processing means for processing the software by each of the unit data;

counting means for counting a number of times the unit data processed by said processing means whenever each of the unit data is processed by said processing means; and determining means for determining an amount of the usage data of the software in accordance with the number of times the unit data is counted by said counting means.

2. A software using quantity measurement processor according to claim 1, wherein the unit data is compression-processed beforehand, and said processor further comprises expanding means for restoring the unit data by expanding the compressed software.

3. A software usage measurement processor according to claim 2, wherein said processing means detects that the expansion of the unit data by said expanding means is completed and thus detects that the software is employed.

4. A software usage measurement processor for obtaining usage data of software which contains plural items of unit data indentifiable from each other, said processor comprising:

processing means for processing the software by each of the unit data;

counting means for counting a number of the unit data processed by said processing means whenever each of the unit data is processed by said processing means; and determining means for determining the usage data of the software in accordance with the number of unit data counted by said counting means, and said determining means including a second count value indicating a software using quantity, and the second count value is changed corresponding to a variation in a first count value by said counting means.

5. A software usage measurement processor according to claim 4, further comprising usage hindering means for hindering the usage of the software when the second count value becomes a predetermined value.

6. A software usage measurement processor according to claim 5, wherein the unit data is image data for displaying an image, and said usage hindering means superimposes a video signal for hindering a normal display of the image on the image data.

7. A software usage measurement processor according to claim 5, wherein the unit data is encrypted beforehand, and said processor further comprises decrypting means for decrypting the encrypted unit data only when the second count value is not the predetermined value.

8. A software using quantity measurement processor for obtaining using quantity data about a usage of software which contains plural items of unit data identifiable from each other, said processor comprising:

detecting means for detecting the usage of the unit data;

counting means for counting a total number of usages of the unit data that are detected by said detecting means; and determining means for determining the using quantity of the usage of the software in accordance with a counting result of said counting means, wherein said determining means has a second count value indicating a software using quantity, and the second count value is changed corresponding to a variation in as first count value by said counting means, and wherein the software is composed of plural items of unit image data for regenerating A moving picture, said processor further comprises mode switching means for selectively switching a first mode for reproducing the moving picture as it is by consecutively outputting the plural items of unit image data and a second mode for reproducing the moving picture at a high speed by skip-outputting the plural items of software, and said determining means sets a variation rate of the second count value corresponding to the change in the first count value during the second mode smaller than a variation rate of the second count value corresponding to the change in the first count value during the first mode.

9. A software using quantity measurement processor according to claim 8, wherein the unit image data is compression-processed beforehand, said processor further comprises restoring means for restoring the compressed software, and said processing means detects that the unit image data is employed by detecting that the restoration of the software by said restoring means is completed.

10. A multimedia information outputting apparatus for outputting information composed by plural items of data containing at least image data and audio data, said apparatus comprising:

integration processing means for integration-processing data about a using quantity corresponding to the number of outputs each time one unit of the image data is outputted; and hindering means for hindering the outputs of at least some items of data among the plural items of data constituting the information when the integration-processed using quantity data reaches a predetermined value.

11. A multimedia information outputting apparatus for outputting information composed by plural items of data containing at least image data and audio data through different output terminals with a separation into at least the image data and the audio data, said apparatus comprising:

a circuit for generating an output signal each time one unit of the image data is outputted;

an integration processing circuit for calculating using quantity data corresponding to the number of generations of the unit by integration-processing the number of generations of the output signal; and output control means for processing at least one item of data and supplying the processed data to the corresponding output terminal when the using quantity data reaches a predetermined using quantity.

12. A multimedia information outputting apparatus for inputting information consisting of at least a first item of image data undergoing predetermined processing and a second items of image data undergoing no predetermined processing, converting these items of image data into a before-processing status and outputting the respective items of converted data through output terminals, said apparatus comprising:

converting means for converting said first item of image data into the before-processing status;

first supplying means for supplying the first item of image data converted by said converting means to the output terminal;

second supplying means for supplying the second item of image data to the output terminal through no intermediary of said converting means;

integration processing means for integrating a using quantity of the image data on the basis of the number of outputs each time one unit of the first item of image data is outputted; and hindering means for hindering the supply of the first item of image data by said first supplying means when the using quantity integrated by said integration processing means reaches a predetermined using quantity.

13. A multimedia information outputting apparatus according to claim 12, wherein said hindering means causes said second supplying means to supply the second item of image data to the output terminal corresponding to the fact that the using quantity integrated by said integration processing means reaches the predetermined using quantity.

14. A multimedia information outputting apparatus according to claim 12, wherein said multimedia information outputting apparatus has a plurality of output modes of outputting the image data in different modes, and said integration processing means changes a value of the using quantity as a result of the integration processing in every output mode.

15. A multimedia information outputting apparatus for inputting information consisting of at least a first item of image data undergoing predetermined processing and a second item of image data undergoing no predetermined processing, converting these items of image data into a before-processing status and outputting the respective items of converted data through output terminals, said apparatus comprising:

converting means for converting said first item of image data into the before-processing status;

first supplying means for supplying the first item of image data converted by said converting means to the output terminal;

second supplying means for supplying the second item of image data to the output terminal through no intermediary of said converting means;

integration processing means for integrating a using quantity of the image data on the basis of the number of outputs each time one unit of the first item of image data is outputted; and hindering means for hindering the supply of the first item of image data by said first supplying means when the using quantity integrated by said integration processing means reaches a predetermined using quantity; and wherein said hindering means causes said second supplying means to supply the second item of image data to the output terminal corresponding to the fact that the using quantity integrated by said integration processing means reaches the predetermined using quantity, wherein said hindering means includes:

alarm generating means for generating an alarm information signal displaying an alarm;

generation time managing means for managing a generating period of the alarm information signal; and actuating means for causing said second supplying means co supply the second image data to the output terminal when the generating period is made to reach a predetermined period by said generating time managing means.

* * * * *